US012259913B1

(12) United States Patent
Muschett et al.

(10) Patent No.: US 12,259,913 B1
(45) Date of Patent: Mar. 25, 2025

(54) CACHING LARGE LANGUAGE MODEL (LLM) RESPONSES USING HYBRID RETRIEVAL AND RECIPROCAL RANK FUSION

(71) Applicant: Inventus Holdings, LLC, Juno Beach, FL (US)

(72) Inventors: Brien H Muschett, Palm Beach Gardens, FL (US); Justin G Odom, Jupiter, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 0 days.

(21) Appl. No.: 18/441,863

(22) Filed: Feb. 14, 2024

(51) Int. Cl.

| | |
|---|---|
| ***G06F 16/332*** | (2019.01) |
| ***G06F 16/33*** | (2019.01) |
| ***G06F 16/3329*** | (2025.01) |
| ***G06F 16/334*** | (2025.01) |
| ***G06F 16/335*** | (2019.01) |
| ***G06F 16/38*** | (2019.01) |

(52) U.S. Cl.
CPC ...... *G06F 16/3326* (2019.01); *G06F 16/3329* (2019.01); *G06F 16/3347* (2019.01); *G06F 16/335* (2019.01); *G06F 16/38* (2019.01)

(58) Field of Classification Search
CPC ............. G06F 16/3326; G06F 16/3329; G06F 16/3347; G06F 16/335; G06F 16/38
See application file for complete search history.

(56) References Cited

U.S. PATENT DOCUMENTS

| | | | |
|---|---|---|---|
| 6,457,020 | B1 | 9/2002 | Carey et al. |
| 8,539,457 | B2 | 9/2013 | Hamby et al. |
| 9,318,027 | B2 | 4/2016 | Byron et al. |
| 9,529,848 | B2 | 12/2016 | Patel et al. |
| 9,870,415 | B2 | 1/2018 | Meyles et al. |

(Continued)

FOREIGN PATENT DOCUMENTS

| | | |
|---|---|---|
| CN | 115080721 | 9/2022 |
| CN | 110990533 | 8/2023 |

(Continued)

OTHER PUBLICATIONS

Bang, F. (2023, December). GPTCache: An Open-Source Semantic Cache for LLM Applications Enabling Faster Answers and Cost Savings. In Proceedings of the 3rd Workshop for Natural Language Processing Open Source Software (NLP-OSS 2023) (pp. 212-218).

(Continued)

*Primary Examiner* — Richard L Bowen
*Assistant Examiner* — Aryan D Toughiry
(74) *Attorney, Agent, or Firm* — Jon Gibbons; Fleit Intellectual Property Law

(57) ABSTRACT

A system and method for improving computer functionality by retrieving answers/responses to questions/input from a cache such as those used with chatbots and generative AI systems. Disclosed is a multi-layered caching strategy that focuses on the relevance of a cache hit by improving the quality of the answer. The approach demonstrates that response latency is significantly reduced when using caching and how a caching strategy could be applied in various layers of increasing relevance for a simple Question-and-Answer system with the possibility of extending to more complex generative AI interactions.

16 Claims, 10 Drawing Sheets

(56) References Cited

U.S. PATENT DOCUMENTS

| | | | | |
|---|---|---|---|---|
| 9,886,390 | B2 | 2/2018 | Allen et al. | |
| 10,572,801 | B2 | 2/2020 | Mars et al. | |
| 11,216,459 | B2 | 1/2022 | Zhang et al. | |
| 11,593,364 | B2 | 2/2023 | Nahamoo et al. | |
| 11,741,139 | B2 | 8/2023 | Zhuo et al. | |
| 11,853,381 | B2 | 12/2023 | Li et al. | |
| 2015/0081279 | A1* | 3/2015 | Suleman | G06F 40/237 704/9 |
| 2016/0055156 | A1 | 2/2016 | Li et al. | |
| 2019/0163691 | A1 | 5/2019 | Brunet et al. | |
| 2021/0216576 | A1 | 7/2021 | Staub et al. | |
| 2021/0382923 | A1* | 12/2021 | Gragnani | G06F 16/3329 |
| 2022/0156298 | A1* | 5/2022 | Mahmoud | G06F 16/9535 |
| 2022/0310084 | A1 | 9/2022 | Brdiczka et al. | |
| 2022/0327128 | A1 | 10/2022 | Xu et al. | |
| 2022/0358295 | A1 | 11/2022 | Nair et al. | |
| 2022/0366333 | A1* | 11/2022 | Lollo | G06Q 10/0635 |
| 2023/0034011 | A1 | 2/2023 | Sarkar et al. | |
| 2023/0138987 | A1 | 5/2023 | Bo et al. | |
| 2023/0267126 | A1 | 8/2023 | Frieder et al. | |

FOREIGN PATENT DOCUMENTS

| | | | |
|---|---|---|---|
| CN | 113821622 | | 9/2023 |
| CN | 117194056 | | 12/2023 |
| CN | 117370523 | | 1/2024 |
| WO | 2021120707 | A1 | 6/2021 |

OTHER PUBLICATIONS

Jónsson, B. P., Arinbjarnar, M., Pórsson, B., Franklin, M. J., & Srivastava, D. (2006). Performance and overhead of semantic cache management. ACM Transactions on Internet Technology (TOIT), 6(3), 302-331.

Harabagiu, S., Moldovan, D., Pasca, M., Mihalcea, R., Surdeanu, M., Bunsecu, R., . . . & Morarescu, P. (Jul. 2001). The role of lexico-semantic feedback in open-domain textual question-answering. In Proceedings of the 39th Annual Meeting of the Association for Computational Linguistics (pp. 282-289).

Ramírez, G., Lindemann, M., Birch, A., & Titov, I. (2023). Cache & Distil: Optimising API Calls to Large Language Models. arXiv preprint arXiv:2310.13561.

Sahar Mor "12 Techniques to reduce your LLM API bill and launch blazingly fast products", Deep Dives, Ai Tidbits, Jan. 13, 2024.

Zhu, Banghua, et al. "On Optimal Caching and Model Multiplexing for Large Model Inference." arXiv preprint arXiv:2306.02003 (2023).

https://python.langchain.com/docs/integrations/llms/llm_caching.

https://github.com/zilliztech/GPTCache.

https://plg.uwaterloo.ca/~gvcormac/cormacksigir09-rrf.pdf.

https://www.elastic.co/guide/en/elasticsearch/reference/current/rrf.html.

https://towardsdatascience.com/forget-rag-the-future-is-rag-fusion-1147298d8ad1.

https://www.elastic.co/blog/improving-information-retrieval-elastic-stack-hybrid.

https://arxiv.org/abs/2210.11934.

https://medium.com/@sowmiyajaganathan/hybrid-search-with-re-ranking-ff120c8a426d.

https://github.com/rochacon/es-janitor.

* cited by examiner

| Semantic Layer Set (SLS) | | |
|---|---|---|
| Semantic Answers Text (SAT) | Answers Metadata | Semantic Relevance Values (SRV) |
| Answer 1 | Metadata 1 | 85 |
| Answer 2 | Metadata 2 | 78 |
| Answer 3 | Metadata 3 | 77 |
| • • • | • • • | • • • |

800

RRF Algorithm

```
score = 0.0
for q in queries
    if d in result (q):
        score += 1.0/ (k+rank( result(q), d) )
return score
#where
#k is a ranking constant
#q is a query in the set of queries
```

Cost Saving

For the below set of assumptions* the annual cost savings by using caching

| Cost Category | $ No Caching | $ Caching | Savings Amount |
|---|---|---|---|
| LLM Usage | $5,886,720 | $2,941,958 | $2,941,958 |
| User Productivity | $9,703,320 | $1,380,284 | $8,323,036 |
| Cache Hosting | $0 | $12,615 | ($12,615) |
| Total Annual Savings | - | - | $11,252,379 |

*Additional assumptions in the cost of caching include:

1. Embedding model is an on-prem open source text embedding model
2. Index for cache is Q and A
3. Information Retrieval System is on-prem
4. Cache is stored on ephemeral storage
5. Compute for cache is on low cost memory instance

| Parameter | Value | Unit |
|---|---|---|
| Total Users | 8000 | user/model |
| Tokens per question (prompt) | 100 | tokens/sessions |
| Tokens per answer (completion) | 200 | tokens/sessions |
| Total Tokens per session | 300 | tokens/sessions |
| Sessions per user per day | 48 | sessions/day |
| Total tokens per user per day | 14,400 | tokens/user/day |
| Total tokens overall per day | 115,200,000 | tokens/day |
| Cost per token for prompt | 0.00006 | $/token |
| Cost per token for completion | 0.00012 | $/token |
| Cost per session | 0.042 | $/session |
| Total cost per user per day | 2.016 | $/user/day |
| Total cost overall per day | 16,128 | $/day |
| **Total cost per year** | **$5,886,720.00** | **$/year** |

Table 1-LLM Cost without Caching

| Parameter | Value | Unit |
|---|---|---|
| Sessions per user per day (cache hit) | 24 | sessions/day |
| Cost per cached session | 0.00002 | $/session |
| Total cost per user per day (cache hit) | 0.00048 | $/user/day |
| Sessions per user per day (standard) | 24 | sessions/day |
| Total cost per user per day (standard) | 1.008 | $/user/day |
| Total cost per user per day (with cache) | 1.00848 | $/user/day |
| Total cost per day (with cache) | 8,067.84 | $/day |
| Daily saving (with cache) | 8,060.16 | $/day |
| **Annual Saving (with cache)** | **$2,941,958.40** | **$/Year** |

| Metric | No-Cache | Caching | Savings |
|---|---|---|---|
| Transaction Time (latency) | 7 Seconds | 1 Second | - |
| Sessions per user per day | 48 | 48 | - |
| Hourly Rate | $52 | $52 | - |
| Daily Time Spent per User | 0.0933 hours | 0.0133 hours | - |
| Daily cost spent per day | $4.85 | $0.69 | - |
| Total Enterprise-Wide Daily Cost | $38,810.02 | $5,522.73 | - |
| Annual Cost | $9,703,320 | $1,380,284 | - |
| **Annual Savings** | **-** | **-** | **$8,323,036** |

Table 3 - User productivity cost (no-cache vs cache)

*Based upon 8 hours/per day. 5 days per/week with 50 work weeks per/year

| Item | Units | Rate (USD) | Amount (USD) |
|---|---|---|---|
| Indexing Cost | 2 OCUs x 730 hours | 0.24 | 350.40 |
| Search and Query cost | 2 OCUs x 730 hours | 0.24 | 350.40 |
| Managed Storage Cost | 2 GB | 0.024 | 0.05 |
| Embedding Model Hosting | 4 OCU's x 730 hours | 0.24 | 350.40 |
| Total Monthly Cost | - | - | 1051.25 |
| Total Annual Cost | - | - | $12,615.00 |

Table 4 - Cost of Caching Service (Server-less)

FIG. 13

CACHING LARGE LANGUAGE MODEL (LLM) RESPONSES USING HYBRID RETRIEVAL AND RECIPROCAL RANK FUSION

FIELD OF THE DISCLOSURE

The present disclosure generally relates to computer-implemented caching and more particularly to caching when using large language models (LLMs).

BACKGROUND

Generative AI and large language models (LLMs) provide significant benefits for a diverse range of AI tasks, including those involving real-time human-computer interaction. In these tasks, AI systems are expected to respond similarly to conventional search interactions—with sub-second response times. For instance, in a GenAI user scenario, users enter questions into a question-and-answer dialog.

Currently, the processing time for LLMs can be significant, with delays exceeding 10 seconds in some cases. In instances where no explicit cues indicate this waiting period, users often assume the system is malfunctioning, leading them to abandon their requests prematurely.

Furthermore, the cost of using large language models is significant, especially as enterprise adoption increases and as traditional internet search workloads transition to Generative AI platforms.

SUMMARY OF THE INVENTION

A system and method for improving computer functionality by retrieving answers/responses to questions/input such as those used with chatbots and generative AI systems. Disclosed is a multi-layered caching strategy that focuses on the relevance of a cache hit by improving the quality of the answer. The approach establishes that response latency is significantly reduced when using caching and how a caching strategy could be applied in various layers of increasing relevance for a simple Question-and-Answer system with the possibility of extending to more complex generative AI interactions.

More specifically, disclosed is an improved method and system for retrieving answers to questions, especially when applied to large language models. One aspect of the claimed invention provides an improvement to the relevancy of a cache hit.

The claimed invention uses a multi-layer approach. In layer-1, the claimed invention accesses an input question in a text format (QT). Next, metadata (Q-metadata) associated with QT is accessed. The QT is vectorized into a high dimensional vector (QV) using a text embedding algorithm. One example of a high dimension vector is a vector greater than or equal to 1024 dimensions. A text embedding algorithm converts textual data into numerical representations, often in dense vectors, which can then be used as input for machine learning models or other natural language processing (NLP) tasks. These numerical representations capture the semantic and contextual meaning of the text, allowing algorithms to analyze and process textual data more effectively. Examples of text embedding algorithms include GloVe, Word2Vec, BERT, and USE.

The QV is used to search a question portion of a cache (i.e., perform a semantic search with QV) and perform query filtering with Q-metadata to provide a semantic layer set (SLS) of semantic answers in a text format (SAT) with associated answer-metadata (A-Metadata) and semantic relevance values (SRV). Query filtering is a process used in information retrieval systems and databases to refine or narrow down the results returned by a query based on specific criteria or constraints. It involves applying filters or conditions to the question or query to exclude certain items or documents from the result set, focusing on the most relevant or desired information. In one example, the query filtering is performed with Q-metadata, which provides an exact match result, wherein the QV to search the question portion of the cache provides an approximate match ranked by SRV.

In response to the SRV being above a settable value, that SAT is returned with the highest SRV. Otherwise, the QT may create a prompt or specific input to a language model, such as a LLM, if the SRV is not above a settable threshold.

In layer-2 and layer-3, the QT is used to search an answer portion of the cache (i.e., performing a lexical search with QT) and performing query filtering with Q-metadata to provide a lexical layer set (LLS) of lexical answers in text format (LAT) with associated answer-metadata and lexical relevance values (LRV). Next, the SLS is used in the order of SRV from highest to lowest, and LLS from highest to lowest, and a reciprocal rank fusion algorithm is applied to compute a combined ranking set (CRS) for SAT and LAT to provide an identified answer. In one example, the query filtering is performed with Q-metadata, which provides an approximate or even an exact match result, wherein the QT to search a question portion of the cache provides an approximate match ranked by LRV.

The identified answer is returned in response to the CRS being above a settable value. Otherwise, if the CRS is not above the settable threshold, send QT to create a prompt.

Other features and advantages of the invention will become apparent to those skilled in the art upon review of the following detailed description, claims, and drawings.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 8 illustrates an example algorithm to perform reciprocal rank fusion (RRF), according to one aspect of the present invention;

FIG. 9 illustrates an example cost savings table with and without caching, according to one aspect of the present invention;

FIG. 10 illustrates an example cost table without LLM cache, according to one aspect of the present invention;

FIG. 11 illustrates an example cost table with LLM cache, according to one aspect of the present invention;

FIG. 12 illustrates an example of user productivity with and without LLM cache, according to one aspect of the present invention;

FIG. 13 illustrates an example server system with and without LLM cache, according to one aspect of the present invention.

DETAILED DESCRIPTION

Figure 1:
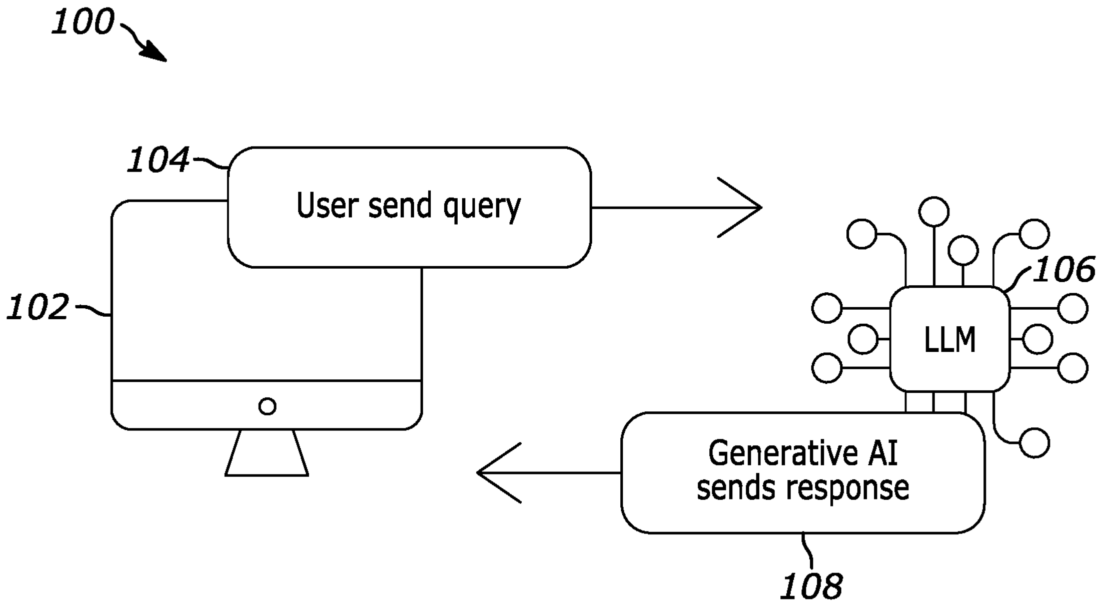
FIG. 1 illustrates a high-level example of a client console sending a query to a generative artificial intelligence (AI) system with a large language model (LLM), according to the prior art.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting but merely as a basis for the claims and as a representative basis for teaching one skilled in the art to variously employ the disclosed subject matter in virtually any appropriately detailed structure and function. Further, the terms and phrases used herein are not intended to be limiting but rather to provide an understandable description.

Non-Limiting Definitions

The terms "a" or "an", as used herein, are defined as one or more than one. The term plurality, as used herein, is defined as two or more than two.

The term "adapted to" describes the hardware, software, or a combination of hardware and software that is capable of, able to accommodate, to make, or that is suitable to carny out a given function.

The term "another", as used herein, is defined as at least a second or more.

The term "completion" or "answer" is the output generated by a language model in response to a prompt.

The term "configured to" describes hardware, software or a combination of hardware and software that is adapted to, set up, arranged, built, composed, constructed, designed, or that has any combination of these characteristics to carry out a given function.

The term "coupled," as used herein, is defined as "connected," although not necessarily directly, and not necessarily mechanically.

The term "embedding layer" is a layer in a neural network that represents tokens as vectors in a high-dimensional space, encoding the meaning and context of individual tokens.

The term "generative AI" or "GenAI" is a subset of machine learning that involves models capable of generating content such as text, images, video, audio, or speech based on statistical patterns learned from large datasets.

The terms "including" and "having," as used herein, are defined as comprising (i.e., open language).

The term "inference" is the process of using a language model to generate text or content based on a given prompt.

The term "information retrieval system" or "IR" is a combination of algorithms and computational infrastructure that facilitate the relevance of displayed documents to searched queries. An IRS works to sort and rank documents based on the queries of a user.

The term "lexical search" is a type of search that looks for exact matches of words or phrases in a database. It is the simplest and most common type of search, and it is used by all major search engines. Lexical search has a number of advantages. It is fast and easy to implement, and it is very accurate for finding exact matches. However, it has a number of limitations as well. It is not able to handle misspellings, synonyms, or polysemy (when a word has multiple meanings). It also does not take into account the context of the search query, which can lead to irrelevant results.

The term "large language model" or "LLM" is a technology that uses machine learning models to understand and generate human language text.

The term "metadata associated with the answer" or "answer-metadata" refers to additional information associated with the answers generated by a system, particularly in the context of a question-answering system or a knowledge-based platform. This metadata is valuable for understanding and assessing the quality, relevance, and context of the provided answers. Here are some common elements of answer metadata:

Confidence Score: A numerical value indicating the system's level of confidence in the correctness or relevance of the provided answer. This score helps users and developers gauge the reliability of the response.

Source Information: Details about the source or sources from which the information was derived. This may include the publication date, author, or the origin of the data used to generate the answer.

Contextual Information: Information about the context in which the answer was generated. This could include details about the user's query, the system's understanding of the question, and any relevant contextual factors.

Ranking or Relevance Score: In cases where multiple potential answers are generated, a ranking or relevance score helps prioritize and present the most suitable answers first. This score is often based on factors like accuracy, recency, and overall relevance.

Feedback History: Information about user feedback on the accuracy or helpfulness of the provided answer. This history can be used to continuously improve the system through user feedback loops.

Time Stamp: The timestamp indicating when the answer was generated. This information can be useful for tracking the timeliness of information, especially in dynamic and rapidly changing domains.

Format or Medium: Information about the format or medium in which the answer is presented. For instance, whether the answer is in text, audio, or visual format.

Linguistic Analysis: Details about the linguistic features of the answer, such as sentiment analysis, tone, or language complexity. This information provides additional insights into the tone and style of the response.

The term "metadata associated with the question" or "question-metadata" refers to the information associated with a question and typically a user within a system or platform. This data provides insights into user characteristics, behaviors, preferences, and interactions. The extent and type of question-metadata collected can vary depending on the context and purpose of the system. Here are some common elements of question-metadata:

Identity Information: This includes details such as the user's name, username, email address, and any other unique identifier used by the system.

Profile Information: Additional details about the user, such as their profile picture, bio, location, and other demographic information.

Preferences: Information about user preferences, including settings, language preferences, and customization choices made within the platform.

Activity and Behavior: Records of the user's actions and interactions within the system. This may include login/logout times, pages visited, features used, and any transactions or interactions with content.

Device Information: Details about the user's device, such as the type of device, operating system, browser, and screen resolution. This information is valuable for optimizing the user experience.

IP Address: The Internet Protocol (IP) address associated with the user's device. This can be used for security purposes and to approximate the user's geographical location.

Timestamps: Information about the timing of user actions or events, which can be useful for analytics, tracking engagement, and understanding user behavior patterns over time.

Authentication Data: Information related to user authentication, including login credentials, authentication tokens, and any security-related data.

The term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The term "positional encoding" is the information added to token vectors to maintain the relevance of word order in the input sequence.

The terms "question" and "answer" are used interchangeably herein with "request" and "response", and "input" and "output." In one example the input can originate from a human. In another example the input can originate from a computer process.

The term "prompt" is a natural language text describing a task that AI should performed. In the case of LLM a prompt includes everything needed to communicate the request to the LLM. Simply speaking, it is a set of instructions and content for which the LLM should process against.

The term "semantic search" is a more advanced type of search that tries to understand the meaning of words and phrases in order to return more relevant results. Semantic search addresses many of the limitations of lexical search. It is able to handle misspellings, synonyms, and polysemy. It is also able to take into account the context of the search query, which can lead to more relevant results. However, semantic search is more complex and computationally expensive to implement than lexical search. It is also more difficult to evaluate the performance of semantic search engines.

The term "token" in the context of Large Language Models (LLMs), refers to a chunk of text that the model reads or generates. A token is typically not a word; it could be a smaller unit, like a character or a part of a word, or a larger one like a whole phrase. Tokenization is a first step in preparing data for Large Language Models (LLMs) because these models don't understand raw text; they process numerical data. The tokenizer's role is to convert text into numbers that the model can understand.

The term "tokenization" is the process of converting human language text into numerical values (tokens) that machine learning models can process.

The term "transformer architecture" or "transformer model" is a neural network architecture known for its efficiency in processing and understanding the context of words in sentences, widely used in generative AI.

It should be understood that the steps of the methods set forth herein are not necessarily required to be performed in the order described, and the order of the steps of such methods should be understood to be merely exemplary. Likewise, additional steps may be included in such methods, and certain steps may be omitted or combined in methods consistent with various embodiments of the present device.

Acronyms Used in this Patent

A-Metadata—Metadata associated with an answer or output
AI—Artificial Intelligence
CRS—Combined Ranking Set
IP—Internet Protocol
IR—Information Retrieval
IRS—Information Retrieval System
GenAI—Generative Artificial Intelligence
LAT—Lexical Answers in Text forma
LFU—Least Frequently Used
LLM—Large Language Model
LLS—Lexical Layer Set
LRU—Least Recently Used
LRV—Lexical Relevance Values
NPL—Natural Language Processing
Q—Question
Q-Metadata—Metadata associated with a question or input
QT—input question or query in text format
QV input question in vectorized format
RAG—Retrieval Augmented Generation
RRF—Reciprocal Rank Fusion
SAT—Semantic Answer in Text format
SLS—Semantic Layer Set
SRV—Semantic Relevance Values

Overview

In computing, a cache is a hardware or software component that stores data so that future requests for that data can be served faster from storage. FIG. 1 illustrates a high-level example 100 of a client console 102 sending a query 104 to a generative artificial intelligence (AI) system 108 with a large language model (LLM) 106, according to the prior art. The generative AI system provides a response, as shown. Examples of generative AI systems with LLMs are chatbots such as ChatGPT, Copilot, Bard, and LLaMA, and text-to-image artificial intelligence art systems such as Stable Diffusion, Midjourney, and DALL-E. However, the present invention is not limited to these examples.

Figure 2:
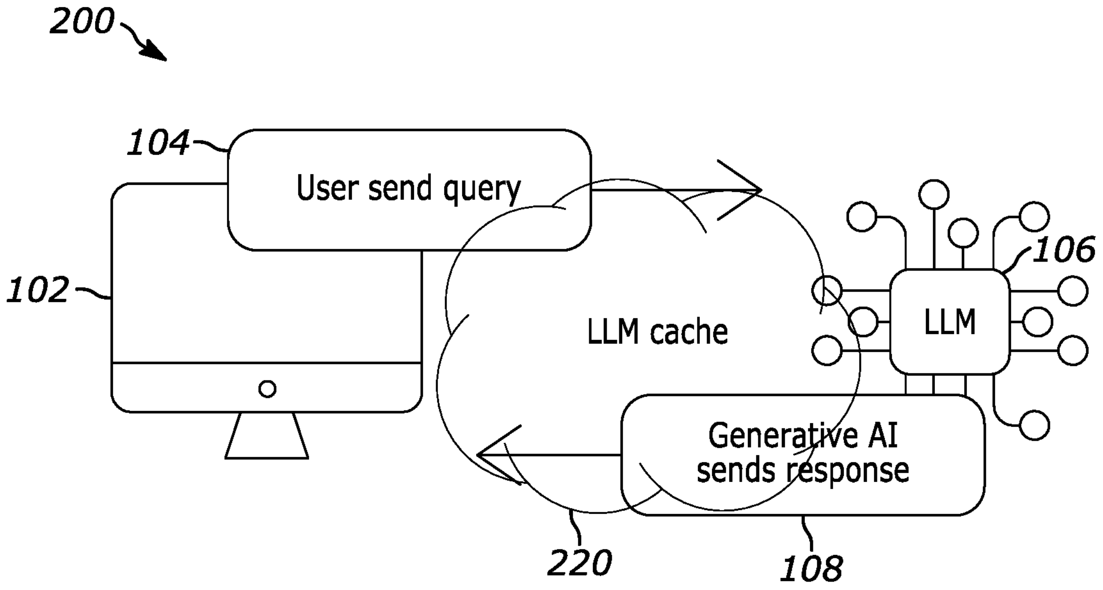
FIG. 2 illustrates a high-level example of a client console sending a query to a generative AI system with a LLM and a LLM cache, according to one aspect of the present invention.

FIG. 2 illustrates a high-level example 200 of a client console 102 sending a query 104 such as "How Tall is the Eiffel Tower?" to a generative AI system 108 with a LLM 106 and a LLM cache 220, as shown.

One aspect of the claimed invention provides a three-layer caching method for the purpose of improving the relevancy of cache hits. The improvement of cache hits in turn reduces response times and costs associated with the use of generative pre-trained transformer models with LLMs. Each of the three layers of the cache will augment the previous layer by improving cache success rates of hits over misses. Layer-2 and layer-3 can be implemented along with layer-1 to improve relevancy. This provides a build progression in which layer-1 can be implemented as a first step, and layer-2 and layer-3 add layers to improve caching hits.

More specifically, the proposed solution provides a solution to mitigate GenAI processing delays and costs by introducing an LLM cache as shown in FIG. 2. Serving as an intermediary between the end user and the LLM, this cache expedites user requests by referring to prior similar requests and their corresponding LLM responses. By leveraging this mechanism, the latency for user request processing can be significantly reduced from seconds to sub-second response times. Additionally, the LLM cost is dramatically reduced as the cache becomes saturated.

Benefits of the Claimed Invention Include

LLM caching of previous questions and responses results in sub-second times. LLM caching of similar questions improves the hit rate over traditional exact matches. The invention leverages an Information Retrieval System (IRS) to cache over traditional "exact" match databases by powering the information retriever (IR) with vector/similarity search used in Gen AI solutions.

The invention helps achieve sustainability goals and enables disconnected or unreliable edge use cases. IRS is used to perform "approximate match" caching. The cache is preloaded with questions and responses offline. Answers in the cache become ground truth for information retrievers.

Overview of LLM Caching Architecture

Figure 3:
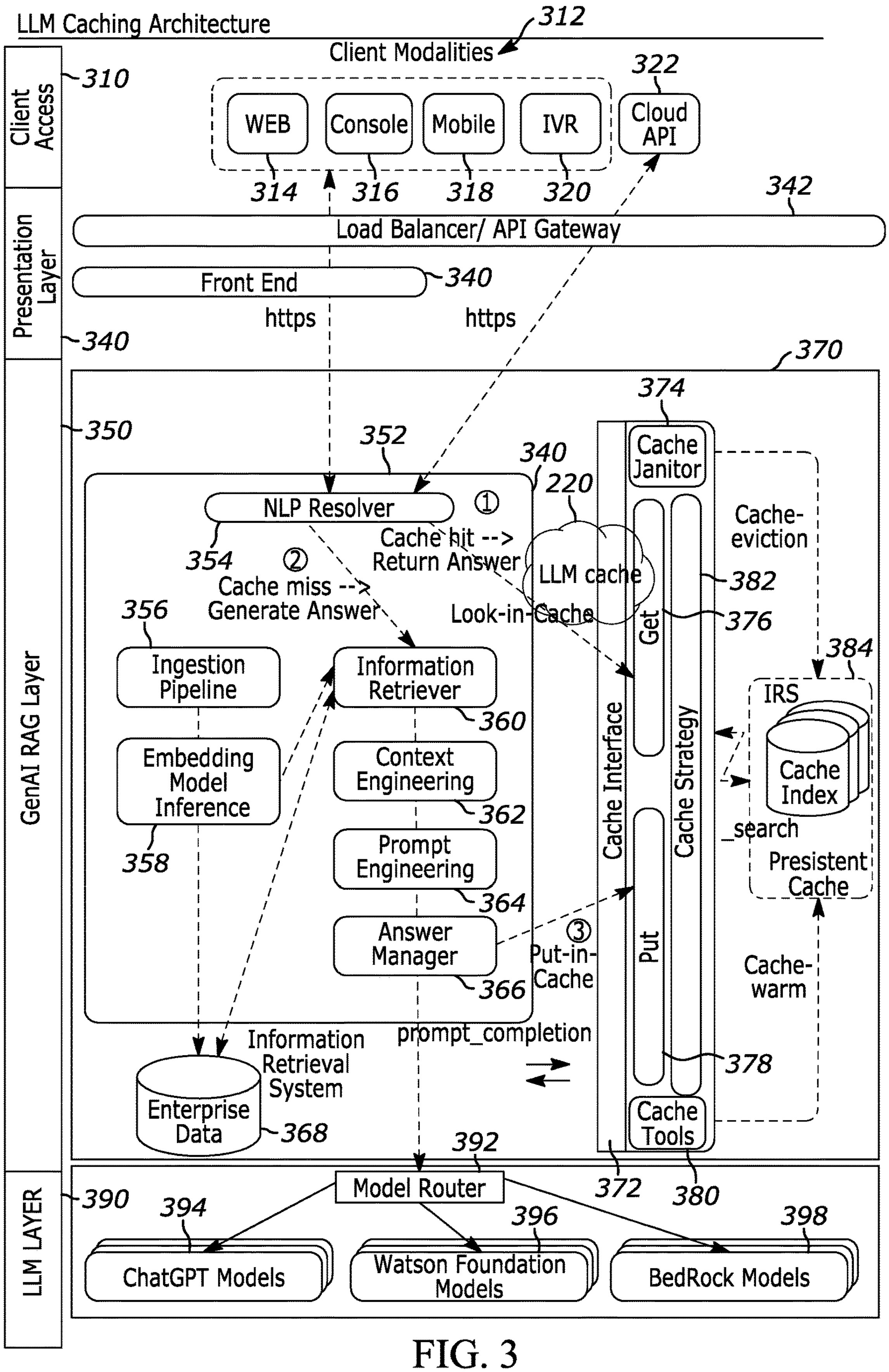
FIG. 3 illustrates an example of LLM caching architecture with a LLM cache, according to one aspect of the present invention.

Turning now to FIG. 3 illustrates an example of LLM caching architecture 300 with a LLM cache. The client access 310 includes various client modalities 312 such as web access 314, console 316, such as a game console access, mobile access 318, such as handheld devices, wearable devices, and wireless phones, interactive-voice response systems 320, such as smart speakers and phone systems, and cloud APIs 322 from use by other applications and apps. Input from other applications and apps may originate from another computer or computer process.

The client access 310 sends and receives data through load balance/API gateway 342, typically through HTTPS requests or other protocols to a front-end system 344 in the presentation layer 340 and generative AI RAG Layer 350. In the context of a chatbot, the term "RAG Layer" represents the layer responsible for generating natural and contextually appropriate language responses 352. Key features of a Generative AI RAG Layer for chatbots may include Natural Language Processing (NLP) 354. The RAG layer leverages advanced NLP models to understand and interpret user input. This involves techniques such as tokenization, part-of-speech tagging, and sentiment analysis to grasp the nuances of the conversation. Also shown is an ingestion pipeline 356 incorporating retrieval methods in the data ingestion process to fetch relevant information. This works with an embedding model inference 358 to the process of utilizing a pre-trained embedding model to map input data, such as text or images, into a continuous vector space where similar items are represented by nearby points. Embedding models are a type of machine learning model commonly used for tasks like natural language processing (NLP) and computer vision. In the context of NLP, embedding models like Word Embeddings (e.g., Word2Vec, GloVe) or Transformer-based models (e.g., BERT, GPT) are trained on large corpora to learn contextual representations of words or phrases. During inference, these models can be used to transform input text into dense or high dimensional vectors that capture semantic relationships and context.

For example, in the case of a sentence embedding model, the input sentence "How Tall is the Eiffel Tower?" might be transformed into a high-dimensional vector. Similar sentences may have vectors that are close together in this space.

The NLP 354 may communicate with an information retriever 360 to retrieve relevant documents based on user queries. Also shown is context engineering 362 refers to the process of manipulating or shaping the contextual information surrounding natural language text to enhance the performance of NLP models. Prompt engineering 364 refers to the process of crafting effective prompts for natural language understanding models, such as ChatGPT 394, Watson Foundation Model 396, and BedRock Model 398, shown in LLM Layer 390 routed by model router 392.

Other aspects of the RAG Layer 350 may include

- Generative Models: Utilizes generative models, generally based on neural networks like GPT (Generative Pre-trained Transformer), to generate coherent and contextually relevant responses. These models are typically pre-trained on datasets to capture diverse language patterns.
- Contextual Understanding: The RAG Layer maintains context awareness by considering the entire conversation history. It understands the context of the current user query in relation to previous interactions, enabling more personalized and contextually appropriate responses.
- Dynamic Adaptation: Capable of dynamically adapting to changes in the conversation flow. This includes adjusting response styles based on user engagement, sentiment, or specific conversational triggers.
- User interaction: Supports interactive elements in responses, allowing the chatbot to engage users in dynamic and meaningful conversations. This could involve asking follow-up questions, providing options for user choices, or adapting responses based on user preferences.
- Realism and Diversity: Aims to generate responses that are realistic and diverse, avoiding repetitive or scripted interactions. This diversity enhances the user experience and makes the chatbot feel more natural and engaging.
- Scalability: Designed to be scalable to handle various conversational scenarios and user inputs. The layer should be able to adapt to different domains, industries, and language contexts to provide versatile conversational capabilities.
- Integration with Dialog Management: Seamless integration with a dialog management system to ensure coherent and structured conversations. The RAG Layer collaborates with the dialog manager to maintain a logical flow of interaction and handle multi-turn conversations effectively.
- Learning and Adaptation: Incorporates mechanisms for continuous learning and adaptation. This involves updating the generative models with new data to stay current with language trends, user preferences, and evolving conversational patterns.

A Generative AI RAG Layer 350 for chatbots focuses on the dynamic generation of natural language responses, ensuring that the chatbot interacts with users in a realistic, contextually aware, and engaging manner. This layer is fundamental to the overall conversational intelligence of the chatbot, enabling it to provide human-like responses across a variety of contexts and user interactions.

Also shown as part of the Generative AI RAG Layer 350 is a cache system 370 with a cache interface 372. In this example, the cache is a hardware and/or software component that stores data to serve future requests more quickly. It holds a copy of data that is likely to be requested again in the near future.

Cache Put 378 refers to the operation of storing data in the cache system 370. When a system receives a request for certain data, it first checks whether that data is present in the cache. If it is not the cache (i.e. cache miss), the data is retrieved from the primary storage (e.g., a database), and a copy is placed (i.e. put) into the cache for faster access in subsequent requests.

Cache Get 376 refers to the operation of retrieving data from the cache. When a system receives a request for certain data, it checks the cache first. If the data is found in the cache, it can be quickly retrieved, avoiding the need to fetch it from the slower primary storage. The presently claimed invention would enhance the Cache Get 376 and Cache Put 378 operations.

Cache Janitor 374 is a utility responsible for managing the cache, ensuring its cleanliness, and optimizing its performance. This could involve removing stale or unused data, refreshing expired entries, and maintaining the overall health of the cache.

Cache Tools 380 is a set of utilities that caching platforms provide to administer and monitor a caching platform. They may include tools for configuring cache settings, monitoring cache performance, and managing cache content. Popular caching platforms include Redis, Memcached, and various caching libraries within programming languages.

Cache strategy 382 is the algorithm(s) used in managing the cache entries including what is considered a match and when to evict an entry.

Information retrieval system or "IRS" 384 is a combination of algorithms and computational infrastructure that facilitate the relevance of displayed documents to searched queries. An IRS works to sort and rank documents based on the queries of a user.

Caching Strategy

The caching strategy will employ an IRS 384 that leverages one or both of i) semantic search types using text embeddings and ii) lexical search types. One example of an IRS 384 is the Elasticsearch search and analytics engine. These retriever types will be combined (hybrid search) and optionally relevance-engineered using a known technique called reciprocal rank fusion (RRF) as described in the incorporated at the end of this patent.

A natural language query (the user request) and its corresponding LLM answer or response will be cached. When a subsequent user request is received, the cache is first checked to see if a similar request has already been made and, if so will respond with the corresponding LLM answer from the cache; eliminating the downstream request to engineer a prompt, generate a context window and subsequently query the LLM.

The caching strategy can be implemented in three layers: layer 1—Semantic, layer 2—Lexical, layer-3 Fused. In one example, the Semantic Layer can be performed with or without the other two layers. In another example, all three layers are performed.

The combination of Layer 2—Lexical and Layer-3 Fused further provides the benefit of increased accuracy due to increased opportunity for a relevant cache "hit".

In all layers, it is important to understand the confidence score or relevance value of the top result (k=1) from the retriever. A confidence score (CS) at each layer will be established on a use-case-by-use-case basis. The confidence score for Layer-1 is referred to as semantic relevance values (SRV) in a semantic layer set (SLS) of semantic answers (SAT) with associated answer-metadata.

Layer 2 is referred to as lexical relevance values (LRV) in a lexical layer set (LLS) of lexical answers (LAT)

Layer 3 is referred to as a combined set (CRS) for SAT and LAT

In each layer uses the confidence score setting to determine whether or not there is a cache hit. Results are typically at or above a settable threshold.

For a perfect match, the value of CS is 100%.

One important feature to emphasize is layer 1 of the invention is used to match against the question. However, in layer 2, the invention matches the answer. The vector search of layer 1 provides similarity to the point that it can be lexically identical, but the invention improves the search results by finding lexically matching answers.

Metadata is used to provide context to the cache. This makes the responses appropriate to the context for which the cache is used, e.g., the particular role, the particular time, the particular qualities, etc. It can be considered the filter criteria that must match exactly, whereas the searches are ordered by relevancy and never computed as exact matches.

Caching

Cache Lifecycle

A cache is created and persisted for a specific application domain. It is updated as users interact with the domain. The cache is cleared when that particular domain refreshes all content or when Cache Lifetimes are not used. The cache is destroyed when the domain is no longer required.

Cache Lifetime

Entries are placed into the cache with timestamp T. Requests made to the cache can optionally use a freshness lifetime (e.g., If-Modified-Since) to request only results that are within a certain time period. If the cache entry has expired, then a new request to the LLM is made, and the cache entry is updated, thereby evicting the previous entry.

Cache Eviction

To manage memory and keep the cache efficient, entries are not kept indefinitely. When the cache approaches its maximum size or defined thresholds, an eviction process comes into play. The eviction policy, such as LRU (least recently used) or LFU (least frequently used), determines which cache entries to remove. Eviction is necessary for maintaining the performance and avoiding the saturation of the cache. This can be implemented by a cache janitor.

Cache Warming

Over time the cache will become saturated for 80% of the possible requests (fat head). These requests (Q) can be used to warm (pre-load) a cache when the cache has been lifecycled. This activity can occur offline when a new release occurs, etc. In doing so, users will not experience latency as they would if the cache were cold.

Scalability

The use of the information retrieval system as a caching agent is a very simplistic use case. It is, however, expected that the system is capable of scaling horizontally in an automatic fashion, which provides a federated endpoint, e.g., clustering.

Figure 4:
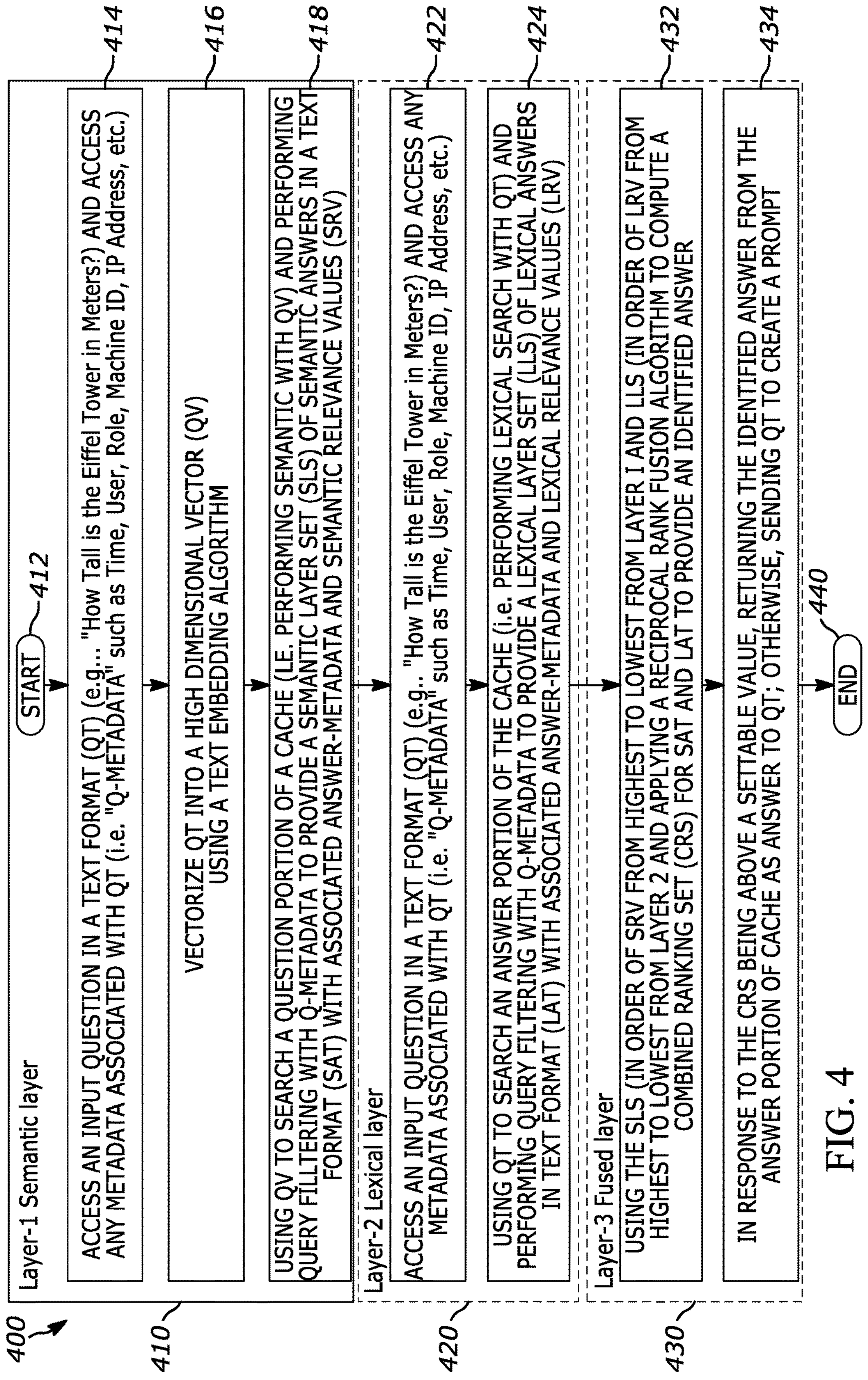
FIG. 4 illustrates an example of flow illustrating layer-1, layer-2 and layer 3, according to one aspect of the present invention.

Each of the three layers is illustrated in FIG. 4. Again, Layer 1 can be performed with or without Layers 2 and 3. Layer 1 Layer 2, and Layer 3

Layer 1—Semantic Layer

Figure 5:
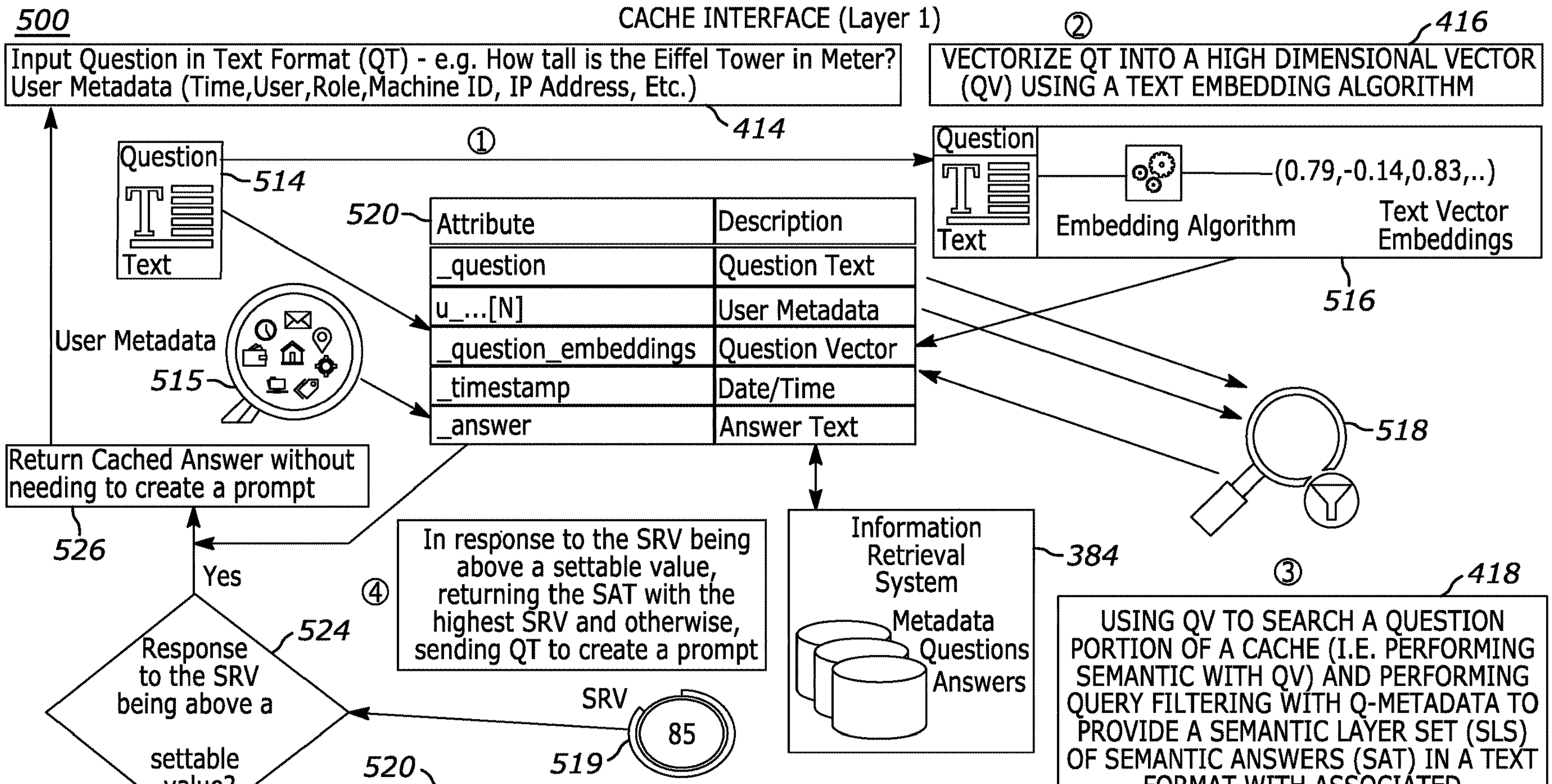
FIG. 5 illustrates an example of a pictorial flow of FIG. 4, illustrating layer-1, according to one aspect of the present invention.

Turning to FIG. 4 illustrates an example of flow 400 illustrating three layers layer-1 410, and optional layer-2 420 and optional layer 3 430. Layer-1 is now discussed. The process flow 400 in FIG. 4 for layer-1 410 is discussed in parallel with FIG. 5. The process starts at step 412 in layer 1, and proceeds to step 414 as shown.

Step 414, accesses an input question in a text format (QT) 514. An example question is "How tall is the Eiffel Tower in meters?". This input is coming through any of the client modalities 312 of FIG. 3. The Question Metadata (Q-Metadata) 515 is associated with QT. This typically includes user metadata. This information is inserted in an example LLM cache entry structure 520, also shown in FIG. 7. The process continues to step 416.

Step 416 is the vectorization of QT into a high dimensional vector (QV) using a text embedding algorithm. This is shown pictorially as 516 in FIG. 5. Examples of text embedding algorithms are described in the incorporated references at the end of this patent. The process continues to step 418.

Step 418, the high dimensional vector or question vector (QV) is used to search a question portion of a cache (i.e., performing semantic with QV) and performing query filtering with Q-Metadata to provide a semantic layer set (SLS) of semantic answers (SAT) in a text format with associated answer-metadata and semantic relevance values (SRV). This is shown pictorially in FIG. 5 with search semantic search and Q-Metadata filtering 518 against the IRS (384). The results are shown as Semantic Layer Set (SLS) 520 with Semantic Relevance Values (SRV) 519. If the SRV is above a threshold 524, this represents a cache hit, and the answer is returned or "get" to question 526. Otherwise, there is a cache miss. The question and metadata are stored or "put" in cache 384, and the question is forwarded to create prompt 522.

Layer 2—Lexical Layer

Figure 6:
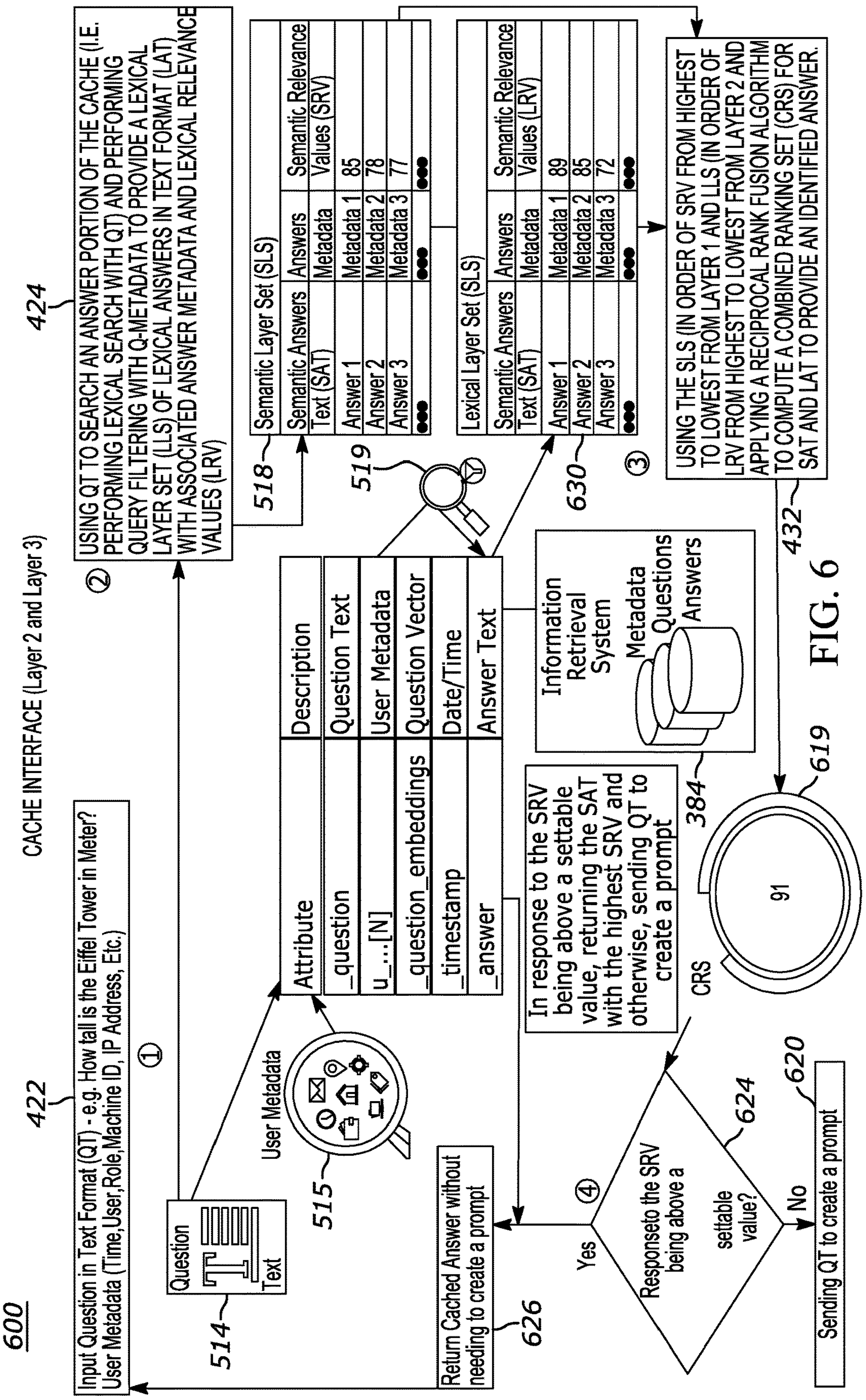
FIG. 6 illustrates an example of a pictorial flow of FIG. 4, illustrating layer-2 and layer-3, according to one aspect of the present invention.

Returning to FIG. 4, an example of flow 400 of optional layer-2 420 is now discussed. Again, this process flow 400 in FIG. 4 is described in parallel with FIG. 5 and FIG. 6. The process starts at step 422 in layer 2 420, as shown.

Step 420, as discussed above for the semantic layer, the process starts with accessing an input question in a text format (QT) 514 (e.g., "How tall is the Eiffel Tower in meters?") and accessing any metadata associated with QT (i.e., "Q-METADATA" such as Time, User, Role, Machine ID, IP Address, etc.). This input is coming through any of the client modalities 312 of FIG. 3. The Question Metadata (Q-Metadata) 515 is typically associated with QT, this typically includes user metadata. This information is inserted in an example LLM cache entry structure 520, also shown in FIG. 7. The process continues to step 424.

In step 424, using QT to search an answer portion of the cache (i.e., performing a lexical search with QT) and performing query filtering 618 with Q-metadata to provide a lexical layer set (LLS) of lexical answers in text format (LAT) with associated answer-metadata and lexical relevance values (LRV) 630.

Layer 3—Fused Layer

Returning to FIG. 4, the example of flow 400 of optional layer-3 430 is now discussed. Again, this process flow 400 in FIG. 4 is described in parallel with FIG. 5 and FIG. 6. The process starts at step 430 in layer 3 432, as shown.

In step 432, using the SLSs 518 (in order of SRV from highest to lowest from layer 1 410 and LLS 630 (in order of LRV from highest to lowest from layer 2 420 and applying a reciprocal rank fusion algorithm to compute a combined ranking set (CRS) for SAT and LAT to provide an identified answer. The process continues to step 434.

In step 434, in response to the CRS 619 being above a settable value 624, the identified answer from the answer portion of the cache is returned as the answer to QT. This represents a "cache hit", and the answer is returned or "get" to the question 526. Otherwise, there is a "cache miss." The question and metadata are stored or "put" in cache 384, and the question is forwarded to create prompt 620.

Example LLM Cache Data Structure

Figure 7:
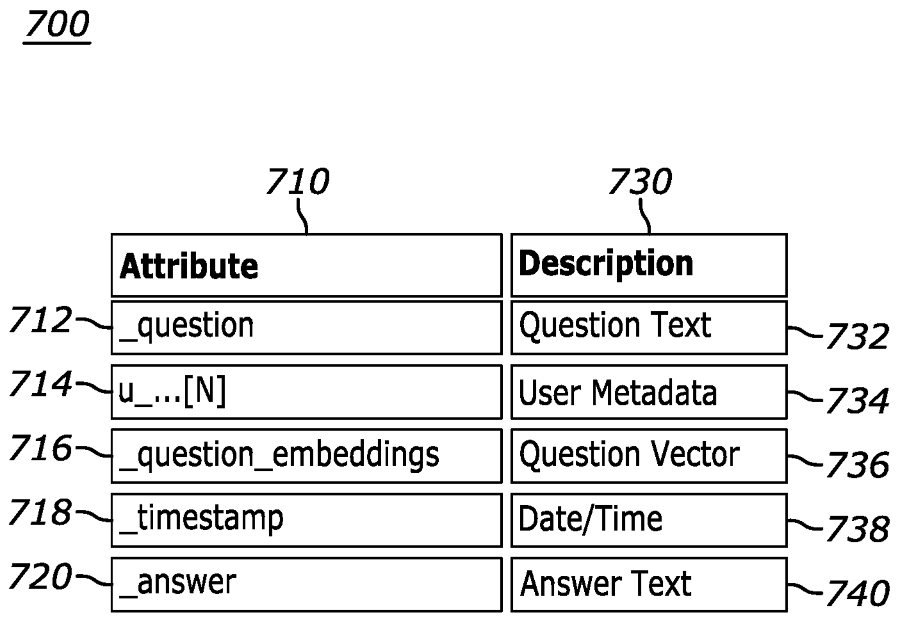
FIG. 7 illustrates an example of an LLM cache entry data structure, according to one aspect of the present invention.

FIG. 7 illustrates an example of an LLM cache entry data structure 700. Shown are the attributes 710 and description 730 for the data structure 700. In order to segregate the system generate name from the user supplied names, a convention is used. Those names prefixed with "_" underscore are system generated/maintained whereas anything prefixed with "u_" is user supplied. As shown the _question 712 is the question text 732. The question metadata 714 is an array of values 734 related to the user. The _question embeddings 716 or question vector 736 after the _question 712 in text format is processed by a text embedding algorithm. Also shown is _timestamp 718 which includes date/time 738. In one example this is populated by a time/date from the user client input system or client modalities 312. In another example, the GenRAG AI layer 350 populates this entry. The _answer 720 is the answer text 740.

GenAI Chat Sessions

The caching strategy can also be applied to Gen AI chat sessions or any other AI tasks—where context and engineered prompts matter. By augmenting the Layer 2 metadata to include a vector of correlation IDs and metadata (prompts etc.) this allows the context to be retained and search results to be more relevant. In doing so, a "chat session" dialog (Q/A pairs) would be related to the individual cache entries to form a dialog chain. Additionally, metadata search facets at the lexical level (Layer 2) can be used to narrow the search results to a specific context in order to ensure relevant cache hits.

Reference Implementation

The above caching strategies were implemented using Elasticsearch as the sole information retrieval system for the TeeTalk Application. JadeX was used to implement all three strategies using an Elasticsearch index as the cache. The index was setup to use the following configuration:

Text Embedding Model: Hugging Face thenlper/gte-large (1024)

Lexical Search for the A

Vector Search for Q

Hybrid Search for using Q/A

Reciprocal Rank Fusion to relevance engineer the hybrid search

LLM: ChatGPT 4

Confidence Level for Layer 1: 95%

Performance Observations:

Without caching: ~18 seconds for LLM answer

With Layer 1 caching: <1.5 seconds

With Layer 2 caching: <1.75 seconds

With Layer 3 caching: <2.00 seconds

Example Reciprocal Rank Fusion (RRF)

FIG. 8 illustrates an example algorithm to perform reciprocal rank fusion (RRF) 800. This is a Python code fragment. It calculates a score based on the given queries and their result sets. The score is incremented based on the reciprocal of the sum of a ranking constant k and the rank of a document d within the result set of a query q. The loop iterates through each query and updates the score accordingly. The final score is returned after processing all queries.

Cost Savings/Experimental Data

FIG. 9 illustrates an example of an annual cost savings determination table 900 with and without caching. In this example, if a system has a LLM cost of $5,886,720 and a user productivity cost of $9,703,320 without caching, then the cashing savings are calculated to be $2,941,958 in LLM usage and $1,380,248 in user productivity. When considering an additional $12,615 in cache hosting costs, the total savings resulting from cashing are $11,525,379.

FIG. 10 illustrates an example of a nine parameter determination table 1000 of the $5,886,720 LLM cost of FIG. 9.

FIG. 11 illustrates an example of a six parameter determination table 1100 of the $2,941,958 LLM cost savings of FIG. 9. This table assumes a 50% caching hit.

FIG. 12 illustrates an example of a five parameter determination table 1200 of the user productivity costs of FIG. 9, resulting in $9,703,320 no-cache cost and a $1,380,248 caching cost, which produces the $8,323,036 user productivity cost savings.

FIG. 13 illustrates an example of a four parameter determination table 1300 of the additional $12,615 in cache hosting cost of FIG. 9. More specifically illustrated is a server system with and without LLM cache e.g., serverless caching. Examples of serverless cloud services include AWS Lambda: Amazon Web Services' serverless computing platform, Azure Functions: Microsoft Azure's serverless computing offering, and Google Cloud Functions: Google Cloud's serverless platform.

Information Processing System

Figure 14:
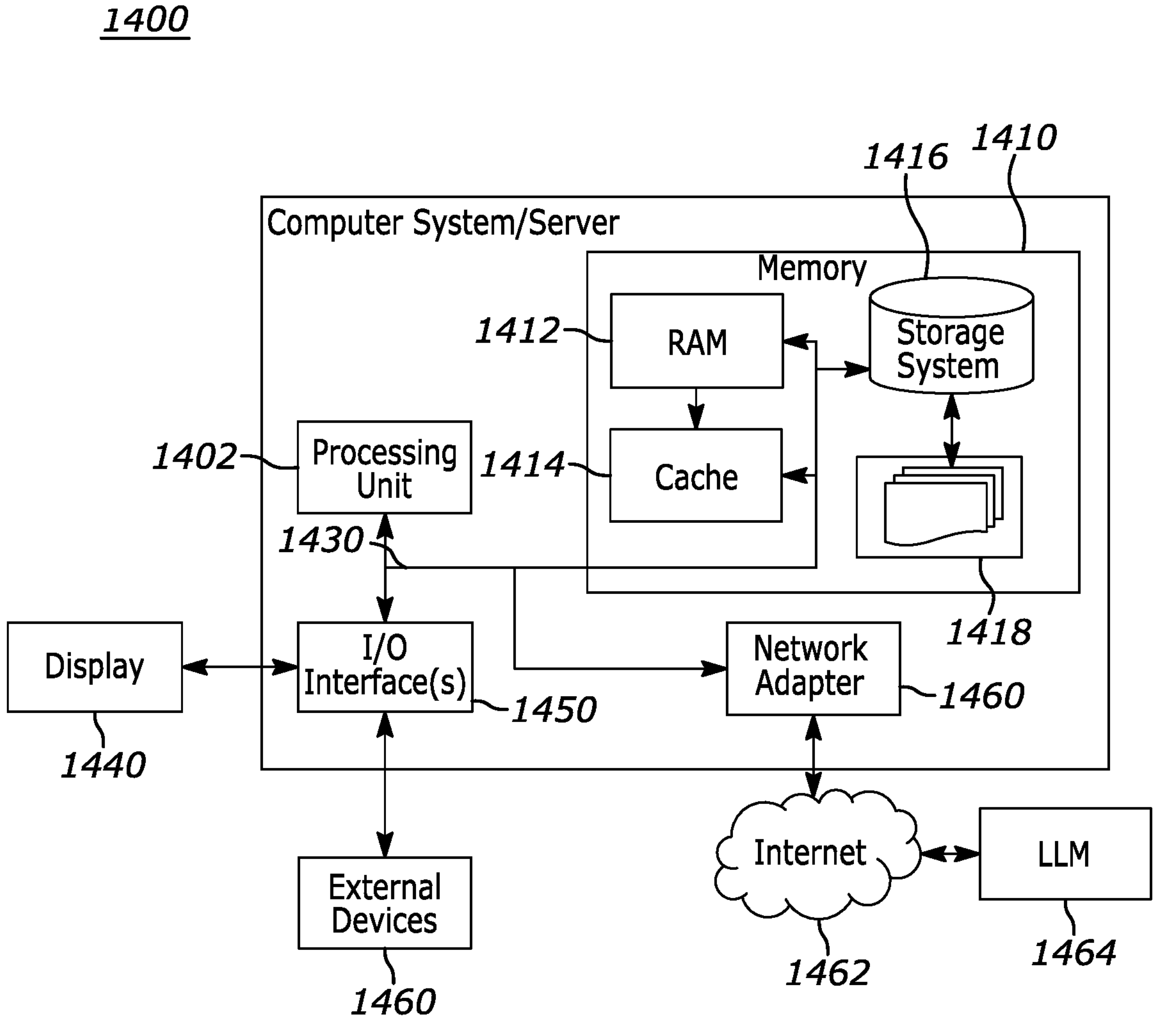
FIG. 14 illustrates an example information processing system for carrying out the aspects of the caching for FIG. 2 through FIG. 7 above, according to one aspect of the present invention.

FIG. 14 is a block diagram of an example of an electronic device 1400 that may carry out the embodiments of FIG. 2 through FIG. 7 above. The components can include but are not limited to, one or more processors 1402 or processing units, a system memory 1410, and a bus 1430 that couples various system components, including the system memory to the processor.

The main memory may include an error identifier, a user interface, user credit reports, a dispute generator, and the various error reports. One or more of these components can reside within the processor or be a separate hardware component. The system memory can also include computer system readable media in the form of volatile memory, such as random access memory (RAM) 1412 and/or cache memory 1414. The error auditing and dispute system can further include other removable/non-removable, volatile/non-volatile computer system storage media. By way of example only, a storage system can be provided for reading from and writing to a non-removable or removable, non-volatile media such as one or more solid state disks and/or magnetic media (typically called a "hard drive") 1416. A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1430 by one or more data media interfaces 1460. The memory 1410 can include at least one program product having a set of program modules that are configured to carry out the functions of an embodiment of the present disclosure.

Embodiments of the present invention may have a set of program modules may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules 1418 generally carry out the functions and/or methodologies of embodiments of the present disclosure.

Embodiments of the present invention can also communicate with one or more external devices such as a keyboard, a pointing device, a display 1440, etc.; one or more devices that enable a user to interact with the information processing system; and/or any devices (e.g., network card, modem, etc.) that enable computer system/server to communicate with one or more other computing devices. Such communication can occur via I/O interfaces 1450. Still yet, the information processing system can communicate with one or more networks such as a local area network (LAN), a general wide area network (WAN), and/or a public network (e.g., the Internet) 1462 via network adapter 1460 to LLM 1464. As depicted, the network adapter communicates with the other components of information processing system via the bus. Other hardware and/or software components can also be used in conjunction with the information processing system. Examples include, but are not limited to: microcode, device drivers, redundant processing units, external disk drive arrays, RAID systems, tape drives, and data archival storage systems.

Non-Limiting Examples

Although specific embodiments of the invention have been discussed, those having ordinary skill in the art will understand that changes can be made to the specific embodiments without departing from the scope of the invention. The scope of the invention is not to be restricted, therefore, to the specific embodiments, and it is intended that the appended claims cover any and all such applications, modifications, and embodiments within the scope of the present invention.

It should be noted that some features of the present invention may be used in one embodiment thereof without use of other features of the present invention. As such, the foregoing description should be considered as merely illustrative of the principles, teachings, examples, and exemplary embodiments of the present invention, and not a limitation thereof.

Also, these embodiments are only examples of the many advantageous uses of the innovative teachings herein. In general, statements made in the specification of the present application do not necessarily limit any of the various claimed inventions. Moreover, some statements may apply to some inventive features but not to others.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

INCORPORATED REFERENCES

The following publications are each incorporated by reference in their entirety and listed in the Information Disclosure:

1. Caching
Python LLM Caching: (python.langchain.com/docs/integrations/llms/llm_caching)
GPTCache (github.com/zilliztech/GPTCache)
2. Reciprocal Rank Fusion
Reciprocal Rank Fusion outperforms Condorcet and individual Rank Learning Methods: (plg.uwaterloo.ca/~gvcormac/cormacksigir09-rrf.pdf)
Reciprocal Rank Fusion in Elasticsearch: (www.elastic.co/guide/en/elasticsearch/reference/current/rrf.html)
Forget RAG, the future is RAG Fusion: (towardsdatascience.com/forget-rag-the-future-is-rag-fusion-1147298d8ad1)
3. Hybrid Retrieval
Improving information retrieval—Hybrid Retrieval: (www.elastic.co/blog/improving-information-retrieval-elastic-stack-hybrid)
An Analysis of Fusion Functions for Hybrid Retrieval: (arxiv.org/abs/2210.11934)
Hybrid Search with Re-Ranking: (medium.com/@sowmiyajaganathan/hybrid-search-with-re-ranking-ff120c8a426d)
4. GitHub
Index Janitor: (github.com/rochacon/es-janitor)

What is claimed is:

1. A method for improving computer functionality by retrieving answers to questions from a cache, the method comprising:
- using a hardware processor communicatively coupled to memory to perform accessing a question stored in primary storage communicatively coupled to a cache, in a text format;
- accessing metadata associated with the question in the text format;
- vectorizing the question in the text format into a high dimensional vector using a text embedding algorithm, wherein the high dimensional vector is greater than or equal to 1024 dimensions;
- using the high dimensional vector to search a question portion of the cache using a plurality of retriever types to create a hybrid search, in which the hybrid search combines one or more text format queries using the metadata with one or more high dimensional vector queries in a single search request;
- performing query filtering with the metadata associated with the question to provide a semantic layer set of semantic answers in a text format with metadata associated with an answer and semantic relevance values;
- using the question in the text format to search an answer portion of the cache and performing query filtering with the metadata associated with the question to provide a lexical layer set of lexical answers in the text format with the metadata associated with the answer and lexical relevance values;
- using the semantic layer set in order of the semantic relevance values from highest to lowest and the lexical layer set from highest to lowest; and
- applying a reciprocal rank fusion algorithm to compute a combined ranking set for the semantic answers in the text format and the lexical answers in the text format to provide an identified answer.

2. The method of claim 1, further comprising:
- in response to the semantic relevance values being above a settable value, returning the semantic answers in the text format with the highest semantic relevance values and, otherwise, sending the question in the text format to create a prompt.

3. The method of claim 1, further comprising: in response to the combined ranking set being above a settable value, returning the identified answer and, otherwise, sending the question in the text format to create a prompt.

4. The method of claim 1, wherein the performing query filtering with the metadata associated with the question provides an exact match result, wherein the high dimensional vector to search the question portion of the cache provides an approximate match ranked by the semantic relevance values.

5. The method of claim 1, wherein the performing query filtering with Q-metadata provides an exact match result, wherein the question in the text format to search a question portion of the cache provides an approximate match ranked by the lexical relevance values.

6. The method of claim 1, further comprising:
- in response to a subsequent question is received, the cache is first checked to see if a similar request has already been made and, in response, retrieving the answer from the cache.

7. The method of claim 1, wherein the accessing a question in a text format includes accessing a question that originated from a human user or from a computer process.

8. A method for improving relevancy of a cache hit, the method comprising:
- operating a cache communicatively coupled to primary storage in an information retrieval system;
- accessing a question in a text format;
- accessing metadata associated with the question in text format;
- vectorizing the question in the text format into a high dimensional vector using a text embedding algorithm, wherein the high dimensional vector is greater than or equal to 1024 dimensions;
- using the high dimensional vector to search a question portion of the cache using a plurality of retriever types to create a hybrid search, in which the hybrid search combines one or more text format queries using the metadata with one or more high dimensional vector queries in a single search request;
- performing query filtering with the metadata associated with the question to provide a semantic layer set of semantic answers in a text format with metadata associated with an answer and semantic relevance values;
- using question in the text format to search an answer portion of the cache and performing query filtering with the metadata associated with the question to provide a lexical layer set of lexical answers in the text format with the metadata associated with the answer and lexical relevance values;
- using the semantic layer set in order of the semantic relevance values from highest to lowest and the lexical layer set from highest to lowest;

applying a reciprocal rank fusion algorithm to compute a combined ranking set for the semantic answers in the text format and the lexical answers in the text format to provide an identified answer; and in response to the combined ranking set being above a settable value, returning the identified answer and, otherwise, sending the question in the text format to create a prompt.

9. The method of claim 8, wherein the performing query filtering with the metadata associated with the question provides an exact match result, wherein the high dimensional vector to search the question portion of the cache provides an approximate match ranked by the semantic relevance values.

10. The method of claim 9, wherein the performing query filtering with the metadata associated with the question provides an exact match result, wherein the high dimensional vector to search a question portion of the cache provides an approximate match ranked by the lexical relevance values.

11. A system for improving computer functionality by retrieving answers to questions from a cache, the system comprising the cache communicatively coupled to primary storage in an information retrieval system;

memory;

at least one processor communicatively coupled to memory and the information retrieval system, programmed to perform;

accessing metadata associated with the question in text format;

vectorizing the question in the text format into a high dimensional vector using a text embedding algorithm, wherein the high dimensional vector is greater than or equal to 1024 dimensions;

using the high dimensional vector to search a question portion of the cache using a plurality of retriever types to create a hybrid search, in which the hybrid search combines one or more text format queries using the metadata with one or more high dimensional vector queries in a single search request;

performing query filtering with the metadata associated with the question to provide a semantic layer set of semantic answers in a text format with metadata associated with an answer and semantic relevance values;

using the question in the text format to search an answer portion of the cache and performing query filtering with the metadata associated with the question to provide a lexical layer set of lexical answers in the text format with the metadata associated with the answer and lexical relevance values;

using the semantic layer set in order of the semantic relevance values from highest to lowest and the lexical layer set from highest to lowest; and applying a reciprocal rank fusion algorithm to compute a combined ranking set for the semantic answers in the text format and the lexical answers in the text format to provide an identified answer.

12. The system of claim 11, further comprising:

in response to the semantic relevance values being above a settable value, returning the semantic answers in the text format with the highest semantic relevance values and, otherwise, sending the question in the text format to create a prompt.

13. The system of claim 11, further comprising: in response to the combined ranking set being above a settable value, returning the identified answer and, otherwise, sending the question in the text format to create a prompt.

14. The system of claim 11, wherein the performing query filtering with the metadata associated with the question provides an exact match result, wherein the high dimensional vector to search the question portion of the cache provides an approximate match ranked by the semantic relevance values.

15. The system of claim 11, wherein the performing query filtering with Q-metadata provides an exact match result, wherein the question in the text format to search a question portion of the cache provides an approximate match ranked by the lexical relevance values.

16. The system of claim 15, further comprising:

in response to a subsequent question is received, the cache is first checked to see if a similar request has already been made and, in response, retrieving the answer from the cache.

* * * * *